(12) United States Patent
Thye-Moormann

(10) Patent No.: US 10,920,843 B2
(45) Date of Patent: Feb. 16, 2021

(54) SPRING ELEMENT FOR A VEHICLE SHOCK ABSORBER, AND VEHICLE SHOCK ABSORBER AND VEHICLE HAVING SAME

(71) Applicant: BASF SE, Ludwigshafen am Rhein (DE)

(72) Inventor: Frank Thye-Moormann, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/301,149

(22) PCT Filed: May 11, 2017

(86) PCT No.: PCT/EP2017/061382
§ 371 (c)(1),
(2) Date: Nov. 13, 2018

(87) PCT Pub. No.: WO2017/202620
PCT Pub. Date: Nov. 30, 2017

(65) Prior Publication Data
US 2019/0136929 A1 May 9, 2019

(30) Foreign Application Priority Data
May 27, 2016 (EP) ..................... 16171690

(51) Int. Cl.
*F16F 1/373* (2006.01)
*B60G 11/22* (2006.01)
(Continued)

(52) U.S. Cl.
CPC ............ *F16F 1/3713* (2013.01); *B60G 11/22* (2013.01); *F16F 9/54* (2013.01)

(58) Field of Classification Search
CPC .......... F16F 1/3731; F16F 1/376; F16F 1/377; F16F 1/3713; B60G 11/22
(Continued)

(56) References Cited

U.S. PATENT DOCUMENTS 3,118,659 A * 1/1964 Paulsen ................. F16F 1/3713
267/35
3,625,501 A * 12/1971 Hein ....................... B61G 7/10
267/153
(Continued)

FOREIGN PATENT DOCUMENTS

DE     1 800 990 U    11/1959
DE    195 48 770 A1    6/1997
(Continued)

OTHER PUBLICATIONS

EPO translation; DE 101 24 924 A1, 2002. (Year: 2002).*
(Continued)

*Primary Examiner* — Thomas J Williams
(74) *Attorney, Agent, or Firm* — Oblon, McClelland, Maier & Neustadt, L.L.P.

(57) ABSTRACT

A spring element includes a longitudinal axis, a main body that extends along the longitudinal axis and which can be elastically deformed between an uncompressed base state and a state in which the main body is compressed in the direction of the longitudinal axis, a groove extending peripherally on the outside of the main body, and a supporting ring arranged in the groove. A plurality of cut-outs is formed between the supporting ring and the main body in the groove in the base state of the main body. A vehicle shock absorber and a vehicle can use the spring element.

6 Claims, 7 Drawing Sheets

Figure 1:
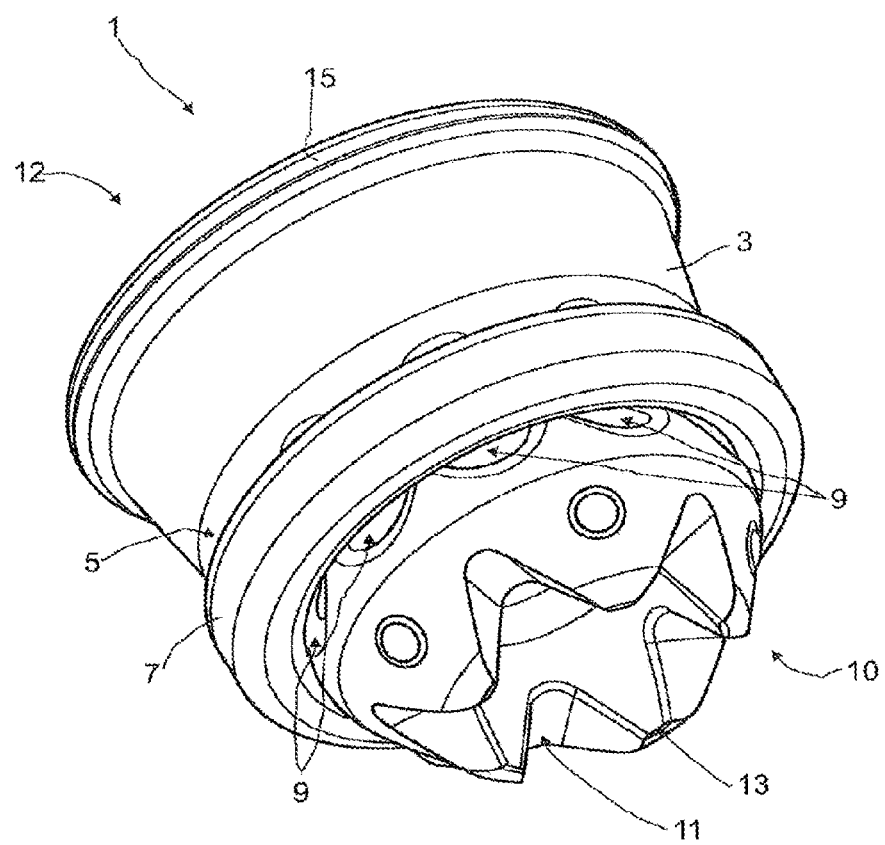

(51) Int. Cl.
*F16F 1/371* (2006.01)
*F16F 9/54* (2006.01)

(58) Field of Classification Search
USPC ....... 267/152, 153, 140, 219, 220, 292, 293, 267/141.4
See application file for complete search history.

(56) References Cited

U.S. PATENT DOCUMENTS

| | | | |
|---|---|---|---|
| 10,399,403 B2 * | 9/2019 | Chambers | B60G 15/067 |
| 2008/0230676 A1 * | 9/2008 | Hansemann | F16F 1/3732 |
| | | | 248/634 |
| 2011/0133380 A1 * | 6/2011 | Harden | B60G 11/52 |
| | | | 267/292 |
| 2016/0009157 A1 * | 1/2016 | Al-Dahhan | F16F 9/58 |
| | | | 280/124.162 |
| 2018/0031068 A1 * | 2/2018 | Szekely | F16F 9/58 |

FOREIGN PATENT DOCUMENTS

| | | | | |
|---|---|---|---|---|
| DE | 195 48 771 A1 | | 6/1997 | |
| DE | 202 04 328 U1 | | 7/2002 | |
| DE | 10124924 A1 | * | 11/2002 | ......... C08G 18/3225 |
| DE | 10157325 A1 | * | 6/2003 | ............. F16F 1/376 |
| DE | 20 2004 003 831 U1 | | 6/2004 | |
| DE | 10 2004 049 638 A1 | | 4/2006 | |
| DE | 102011116899 A1 | * | 4/2012 | ............ F16F 1/3713 |
| EP | 0 036 994 A2 | | 10/1981 | |
| EP | 0 062 835 A1 | | 10/1982 | |
| EP | 0 250 969 A1 | | 1/1988 | |
| EP | 1640634 A1 | * | 3/2006 | ................ F16F 9/58 |
| FR | 2767768 B1 | * | 10/1999 | ............. F16F 1/376 |
| GB | 1123818 A | * | 8/1968 | ............ F16F 1/3732 |
| GB | 2207730 B | * | 7/1991 | ............ F16F 1/3713 |
| JP | H07-83279 A | | 3/1995 | |
| WO | WO-02063179 A1 | * | 8/2002 | ................ F16F 9/58 |
| WO | WO 2004/097250 A1 | | 11/2004 | |
| WO | 2014/164104 A1 | | 10/2014 | |

OTHER PUBLICATIONS

International Search Report dated Jul. 31, 2017 in PCT/EP2017/061382 filed on May 11, 2017.
Chinese Office Action and Search Report issued in Chinese Patent Application No. 2017800276460 dated Apr. 28, 2020.

* cited by examiner

SPRING ELEMENT FOR A VEHICLE SHOCK ABSORBER, AND VEHICLE SHOCK ABSORBER AND VEHICLE HAVING SAME

The present invention relates to a spring element for a vehicle shock absorber. The invention also relates to a vehicle shock absorber having such a spring element, and to a vehicle, in particular to a passenger motor vehicle, having such a shock absorber.

Spring elements of the type designated above are generally known. They are used in automobiles, for example within the chassis. They are used, in particular, as vibration-damping spring elements. In addition to the main shock absorber, which is frequently based on metal springs and/or pressurized gas elements, further spring elements (additional shock absorbers), preferably made of elastic material are almost always used. These spring elements are usually hollow bodies which are shaped concentrically and have different diameters and/or wall thicknesses along the spring axis. These spring elements can basically also function as main shock absorbers, but they frequently assume an end stop function in combination with the main shock absorber. In this context, they influence the force/deflection characteristic curve of the sprung wheel by forming or amplifying a progressive characteristic of the vehicle suspension. In this way, the pitching effects of the vehicle can be reduced and the rolling support amplified. In particular, the geometric configuration optimizes the run-up rigidity, and this has a decisive influence on the suspension comfort of the vehicle. This function increases the driving comfort and ensures a maximum degree of driving safety. The targeted configuration of the geometry results in virtually constant component properties over the service life.

One difficulty in the three-dimensional configuration of the additional springs is a frequently desired particularly soft start of the absorption of force, which is also referred to as a soft run-up of the spring element. In order to achieve such a soft run-up, for example laid-open document DE 102004049638 describes peripheral bending lips, which are also referred to as a "flower shape". However, limits are placed on the extension of the bending lip by the geometry of the additional spring, so that the soft run-up can also be varied only within very tight limits. This shaping with a bending lip is also suitable only to a limited degree for particularly high loads. Furthermore, the bending lip has significant disadvantages in terms of the manufacture which mainly takes place using a foaming method. The cavity of the spring element is usually defined in the foaming process by a core, from which the spring element has to be pulled after the hardening process. The loads in the tightly fitting bending lip which occurs in this process give rise to a significant rejection rate. A further disadvantage is the costly deburring which the fabrication of the bending lip entails.

Spring elements of the type denoted at the beginning are designed for use as end stop dampers, preferably with a progressive force/displacement characteristic curve. This means that when compression commences, starting from the uncompressed basic state of the spring element, initially only a small amount of force has to be applied to bring about deformation. As the spring element is progressively compressed, the rigidity of the material also continuously increases.

It has become apparent that the increase in the rigidity in known spring elements does not have a strictly monotonously rising profile but rather that in the starting region of the deformation, that is to say in a region in which the gradient of the force/displacement characteristic curve is still very low, the rigidity assumes an intermediate maximum and initially decreases again after passing through the maximum before the characteristic curve profile rises strongly in a progressive fashion. In certain situations, in the state in which the spring element is installed in a vehicle shock absorber, this characteristic curve behavior can also be perceived by the measurement system provided in the vehicle, by means of acceleration sensors.

There is a need to optimize the characteristic curve profile of the force/displacement characteristic curve or the rigidity profile in the case of the spring element denoted at the beginning, with respect to the phenomena described above. The invention was consequently based on the object of improving the compression behavior in a spring element of the type mentioned at the beginning. In particular, the invention was based on the object of smoothing the rigidity profile when compression of the spring element commences.

The invention solves the problem on which it is based, in a spring element of the type mentioned at the beginning, by proposing a spring element for a vehicle shock absorber, having a longitudinal axis and a base body which extends along the longitudinal axis and can be elastically deformed between an uncompressed basic state and a state in which it is compressed in the direction of the longitudinal axis, a groove which runs around the outside of the base body, and a supporting ring which is arranged in the groove, wherein in the uncompressed basic state of the base body one or more cutouts are formed between the supporting ring and the base body in the groove. The supporting ring is provided according to the invention for increasing the rigidity of the spring element when compression increases, and for ensuring a highly progressive compression behavior. In particular, the supporting ring increases the service life because the transverse extension is limited. The material of the base body is protected and an additional block dimension is established. Block dimension is understood here to be the still remaining extension in the direction of the longitudinal axis at maximum compression of the base body. The supporting ring increases the rigidity of the spring element locally since the spring element can only extend with difficulty in the radial direction in the region of the supporting ring.

The invention makes use here of the realization that the effect of the supporting ring occurs somewhat more moderately owing to the one or more cutouts. As the spring element progressively deforms from the uncompressed basic state into a compressed state, the material of the spring element is deflected, on the one hand, in the direction of the longitudinal axis but, on the other hand, also outward in the radial direction. By virtue of the fact that one or more cutouts are provided between the supporting ring and the groove which accommodates the supporting ring, free spaces into which the material of the spring element can be comparatively easily deflected initially still remain in the cutouts. Since during a deformation the material seeks the deflection with the least resistance, the run-up behavior of the spring element is improved during a compression process of the spring element particularly in the region of the commencing compression, and the rigidity profile is smoothed. The rigidity profile is understood here to be the derivative of the force/deflection profile over time. Only after the cutouts are essentially constantly filled with material of the spring element does the supporting effect of the supporting ring come fully into effect and the force/deflection characteristic curve assumes its highly progressive profile.

In preferred embodiments of the spring element according to the invention, the cutouts are embodied in the form of cylindrical, partially cylindrical or hollow-cylindrical recesses, conically tapering recesses, partially conically shaped recesses, polygonal or partially polyhedron-shaped recesses or a combination of a plurality of those shapes. The term conically tapering recesses is understood to mean recesses which run in a tapered fashion in the direction of the base of the recess and correspond to a certain extent to a negative truncated cone. The partial-polyhedron-shaped recesses also preferably have a free cross section which becomes smaller in the direction of the base of the recess. The partial-spherical recesses are particularly preferred. These have proven advantageous for smoothing the rigidity profile owing to their deformation behavior.

In a further preferred embodiment, a plurality of cutouts are provided and are arranged distributed uniformly over the circumference of the groove. 3, 4, 6, 8, 10, 12, 15, 16, 20 or more cutouts are preferably arranged over the circumference of the groove, which cutouts can be spaced apart from one another or alternatively preferably merge with one another.

In preferred embodiments, the base body is partially or completely composed of an elastomer, preferably of a rubber and/or polyisocyanate-polyaddition product.

In this context, a spring element can be composed of an elastomer, but it can also be composed of a plurality of elastomers which are present in layers, in the form of shelves or in some other form or can also be present in a mixture with one another. The polyisocyanate-polyaddition products are preferably formed on the basis of microcellular polyurethane elastomers, on the basis of thermoplastic polyurethanes or of combinations from these two materials which can, if appropriate, contain polyurea structures.

Particularly preferred are microcellular polyurethane elastomers which in one preferred embodiment have a density according to DIN 53420 of 200 kg/m$^3$ to 1100 kg/m$^3$, preferably 300 kg/m$^3$ to 800 kg/m$^3$, a tensile strength according to DIN 53571 of 2 N/mm$^2$, preferably 2 N/mm$^2$ to 8 N/mm$^2$, elongation according to DIN 53571 of 300%, preferably 300% to 700% and a tear resistance according to DIN 53515 of preferably 8 N/mm to 25 N/mm.

The elastomers are preferably microcellular elastomers based on polyisocyanate-polyaddition products, preferably with cells with a diameter of 0.01 mm to 0.5 mm, particularly preferably 0.01 to 0.15 mm.

Elastomers based on polyisocyanate-polyaddition products and their manufacture are generally known and described in many places, for example in EP-A 62 835, EP-A 36 994, EP-A 250 969, DE-A 195 48 770 and DE-A 195 48 771.

The manufacture is usually carried out by reacting isocyanates with compounds which are reactive to isocyanates.

The elastomers based on cellular polyisocyanate-polyaddition products are usually manufactured in a form in which the reactive starting components are reacted with one another. The molds possible here are generally customary ones, for example metal molds, which by their shape ensure the inventive three-dimensional shape of the spring element. In one embodiment, the contour elements are integrated directly into the casting tool, and in another embodiment they are integrated into the concentric base body subsequently. In one preferred embodiment, the concentric spring element for this purpose is cooled until it solidifies, preferably with liquid nitrogen, and is worked in this state.

The manufacture of the polyisocyanate-polyaddition products can be carried out according to generally known methods, for example by using the following starting substances in a single-stage or two-stage process:

(a) isocyanate,
(b) compounds which are reactive to isocyanates,
(c) water and, if appropriate,
(d) catalysts,
(e) propellants and/or
(f) auxiliary substances and/or additives, for example polysiloxanes and/or fatty acid sulfonates.

The surface temperature of inner wall of the mold is usually 40° C. to 95° C., preferably 50° C. to 90° C. The parts of the mold are advantageously manufactured with an NCO/OH-ratio of 0.85 to 1.20, wherein the heated starting components are mixed and placed in a heated, preferably tightly closing molding tool, in a quantity which corresponds to the desired density of the molded part. The molded parts are hardened after 5 minutes to 60 minutes and can therefore be removed from the mold. The quantity of the reaction mixture which is introduced into the molding tool is usually determined in such a way that the molded elements which are obtained have the density which has already been represented. The starting components are usually introduced into the molding tool at a temperature of 15° C. to 120° C., preferably of 30° C. to 110° C. The degrees of density for manufacturing the molded elements are between 1.1 and 8, preferably between 2 and 6. The cellular polyisocyanate-polyaddition products are expediently manufactured in open or preferably closed molding tools according to the "one-shot" method using the high-pressure technique, the low-pressure technique or, in particular, the reaction injection molding (RIM) technique. The reaction is carried out, in particular, with compression in a closed molding tool. The reaction injection molding technology is described, for example, by H. Piechota and H. Röhr in "Integralschaumstoffe [Integral foamed materials]", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

The spring element according to the invention preferably has dimensions, i.e. lengths and diameters, which are adapted for use as an additional spring and/or main shock absorber. The spring element preferably has a length in the longitudinal direction in a range from 30 mm to 200 mm, particularly preferably in a range from 40 mm to 120 mm. More preferably, the maximum external diameter transversely with respect to the longitudinal axis of the spring element lies in a range from 30 mm to 100 mm, particularly preferably in a range between 40 mm and 70 mm. The cavity of the spring element is preferably in a range between 10 mm and 30 mm.

The supporting ring is preferably partially or completely composed of a thermoplastic, preferably of polyoxymethylene (POM).

In a further preferred embodiment, the supporting ring is partially composed of an elastomer, preferably of rubber, and also has a metal core, which is encased by the elastomer. Preferably aluminum, an aluminum alloy, steel or a steel alloy is used as the metal. For example a mixture of butadiene and poly-isoprene rubber (BR/IR) or ethylene-propylene rubber (EPDM), particularly preferably with a Shore A hardness of 45 or higher, in particular of 75 +/−5, is used as the preferred elastomer. The Shore A hardness is determined, for example, according to DIN 53505:2000-08 or ISO 7619-1:2012-02.

In a further preferred embodiment, when the supporting ring is mounted in the groove, in particular at least in the basic state, a gap remains between the one or more cutouts and the supporting ring, with the result that air can escape from the cutouts. As a result, the penetration of material of the basic body into the cavities provided by the cutouts is facilitated.

The invention solves the problem on which it is based and which is denoted at the beginning in a vehicle shock absorber of the type denoted at the beginning in that said shock absorber has a supporting part, a damper cap which is mounted so as to be movable relative to the supporting part, in the direction of a longitudinal axis, and a spring element having a base body which extends along the longitudinal axis, wherein the base body can be elastically deformed between an uncompressed basic state and a state in which it is compressed in the direction of the longitudinal axis, a groove which runs around the outside of the base body, and a supporting ring which is arranged in the groove, wherein in the uncompressed supporting ring a plurality of cutouts are formed between the supporting ring and the base body. With respect to the advantages which are achieved by the inventive vehicle shock absorber which is equipped with the spring element, reference is made to the statements above relating to the spring element. The above preferred embodiments of the spring element are at the same time also preferred embodiments of the vehicle shock absorber according to the invention.

The invention also solves the problem on which it is based in a vehicle of the type denoted at the beginning which has a number of vehicle shock absorbers in that at least one vehicle shock absorber, and preferably a plurality or all thereof, is/are embodied according to one of the preferred embodiments described above, and/or has/have a spring element according to one of the preferred embodiments described above.

Figure 2:
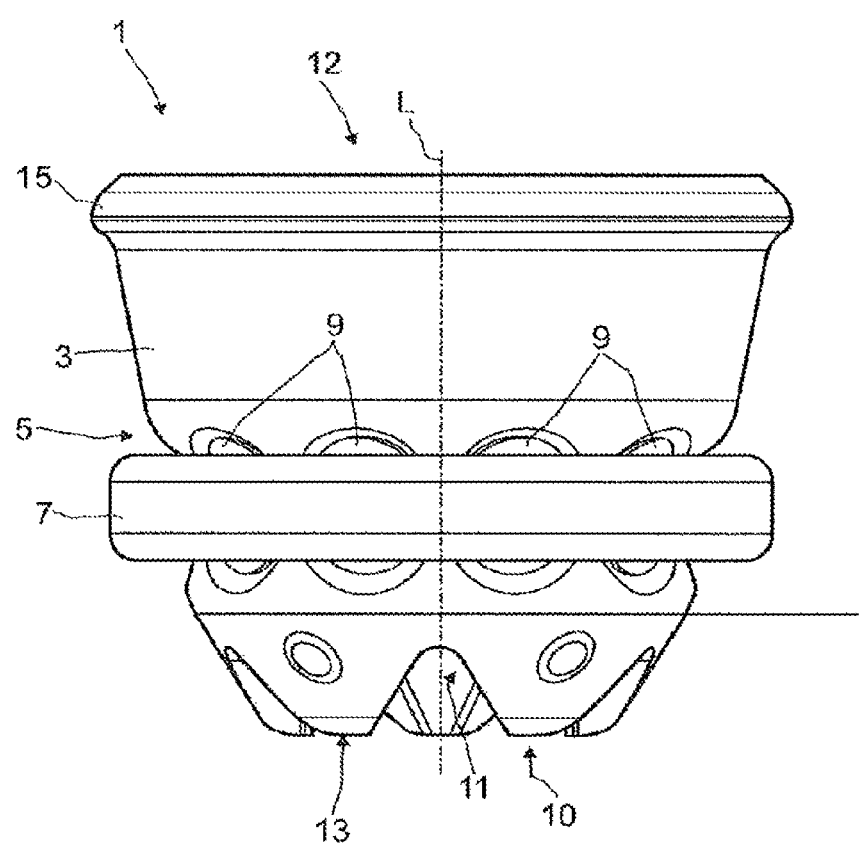
Figure 3:
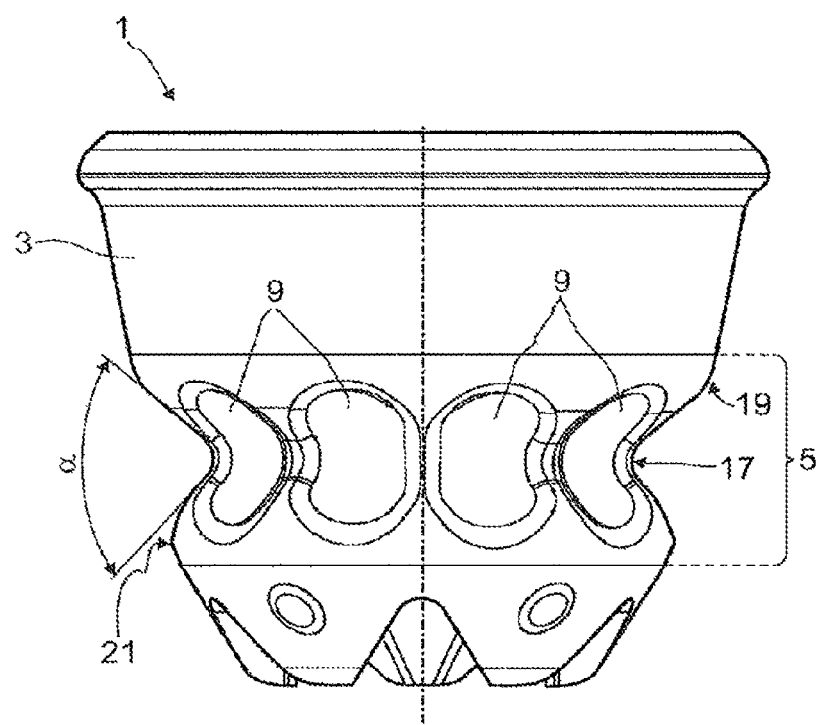
Figure 5:
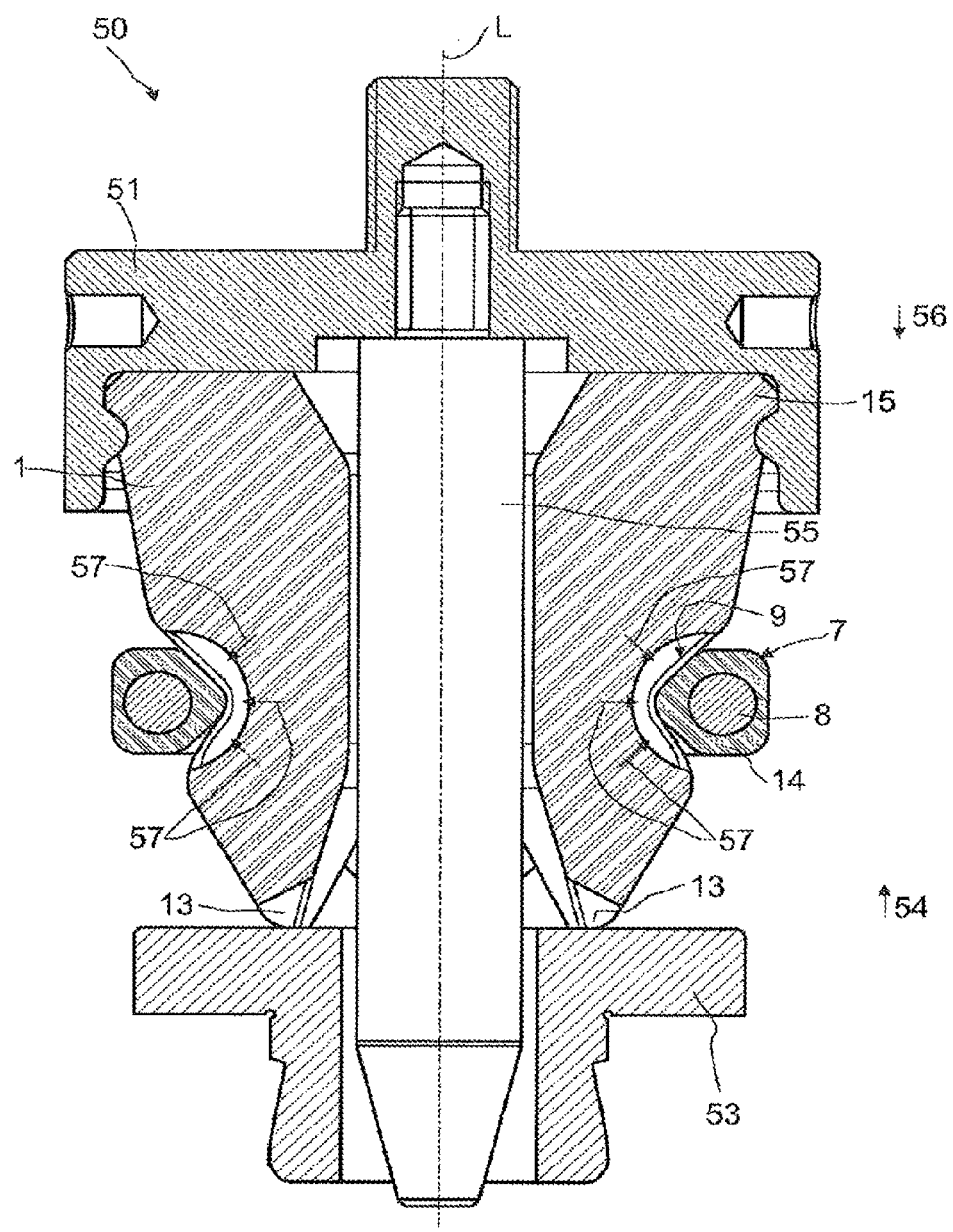
Figure 6:
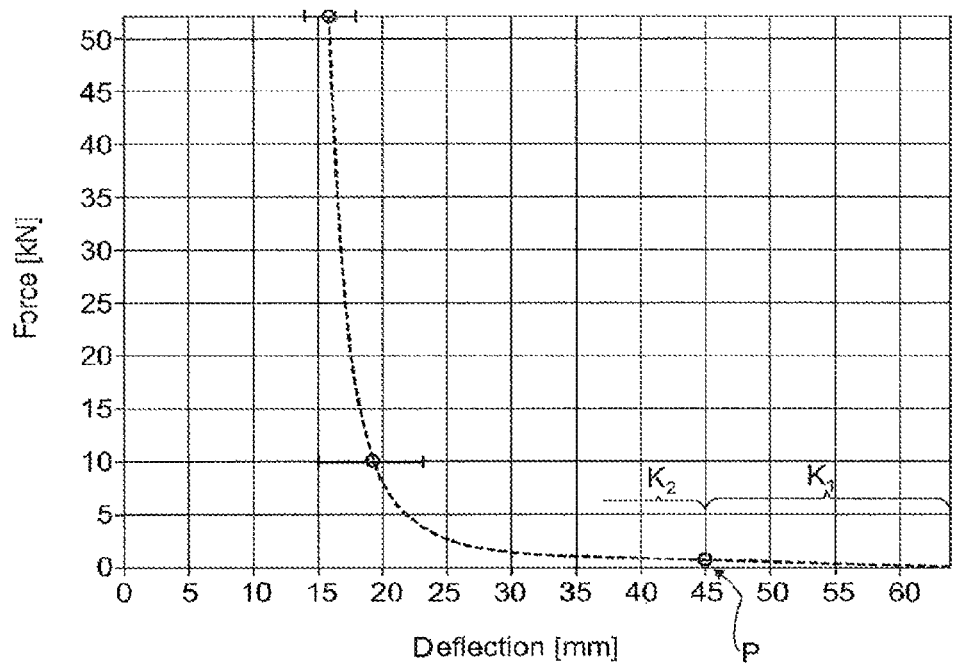
Figure 7:
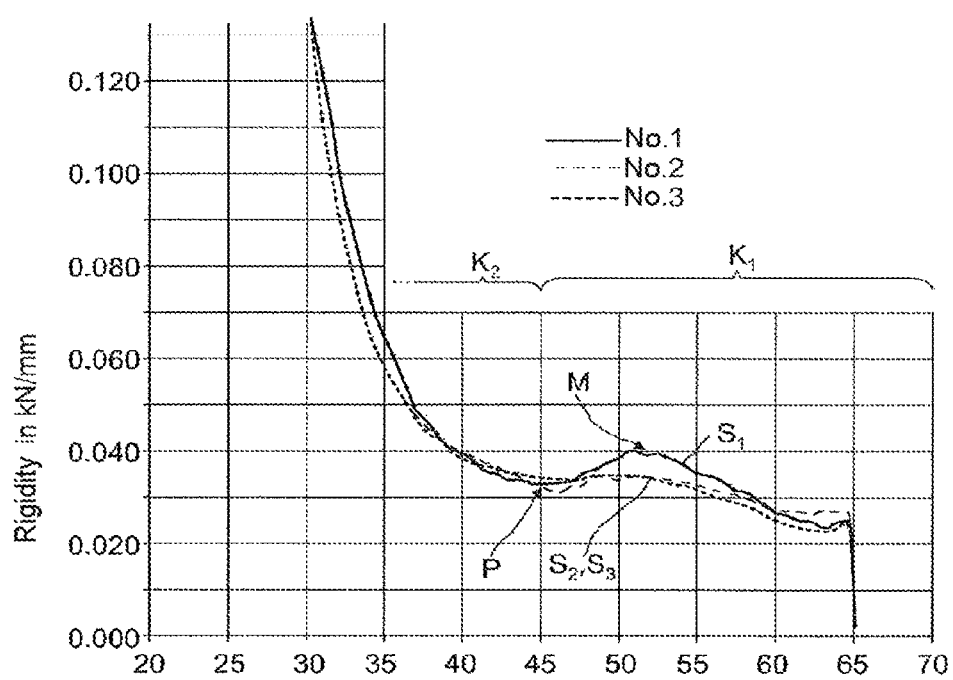

In addition, the invention relates to the use of a spring element as a main shock absorber or as an additional spring in a vehicle shock absorber. The invention solves the problem on which it is based in the case of such a use in that the spring element is embodied according to one of the preferred embodiments described above. The invention will be described below with reference to the appended figures and on the basis of a preferred exemplary embodiment. In the figures:

FIG. 1 shows a schematic spatial illustration of a spring element according to a preferred exemplary embodiment, FIG. 2 shows a side view of the spring element according to FIG. 1, FIG. 3 shows a side view according to FIG. 2 without a supporting ring, according to FIGS. 1 to 3, FIG. 5 shows an installation arrangement of the spring element according to FIGS. 1 to 4, FIG. 6 shows a force/deflection diagram, and FIG. 7 shows a rigidity/deflection diagram.

Firstly, FIG. 1 illustrates a spring element 1 according to a preferred exemplary embodiment of the invention. The spring element 1 has a base body 3. The base body 3 is partially or completely composed of an elastomer, preferably of a rubber or a polyisocyanate-polyaddition product such as, for example, a PUR foam.

The base body 3 has an essentially truncated-cone-shaped lateral surface on the outside of which a peripheral groove 5 is formed. A supporting ring 7 is accommodated in the groove. In addition, a plurality of cutouts 9 are formed in the base of the groove 5, said cutouts having the result that the supporting ring 7 does not bear completely on the surface of the groove 5 of the base body 3 but rather a plurality of cavities corresponding to the number of recesses 9 remain as long as the base body 3 is in the uncompressed basic state (shown in FIG. 1).

Figure 4:
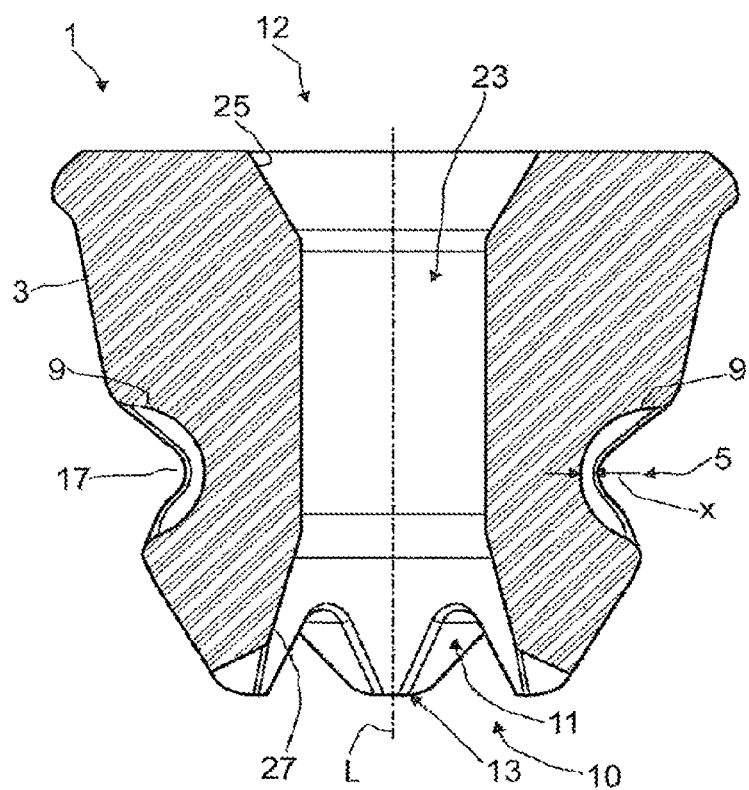

The spring element 1 has a first end side 10 in which a plurality of depressions 11 are formed, with the result that a corresponding number of projections 13, which are adjacent as a result of the depressions 11, are produced which project in the direction of a longitudinal axis L (FIGS. 2, 4, 5).

A mounting flange 15 is formed on a second end side 12 lying opposite the first end side 10. The mounting flange 15 is provided for clamping the spring element 1 in a supporting part of a vehicle shock absorber or a retaining die of a test device (cf. FIG. 5).

FIG. 2 shows the spring element 1 in a side view. As is apparent from the side view, the groove 5 bounds, in the direction of the longitudinal axis L, the region in which the cutouts 9 extend. The cutouts 9 are covered essentially completely by the supporting ring 7, with the result that it is virtually impossible for contamination and relatively large particles to accumulate in the cutouts 9. A small gap between the cutouts 9 and the supporting ring 7 permits air to escape, which facilitates the penetration of material of the base body 3 into the cavities which are provided by the cutouts 9.

A more precise view of the cutouts 9 in the base body 3 of the spring element 1 is given in FIG. 3, where the supporting ring is eliminated for the sake of better illustration. The groove 5 has two groove walls which lie positioned opposite one another at an angle α. The junctions between the groove walls and the outer lateral face of the base body 3 are configured in a flowing fashion by means of a first radius 19 and a second radius 21. The groove base 17 also has a radius 17, which results in a more homogenous deformation behavior in the event of compression. In the exemplary embodiment shown, the cutouts 9 are spaced apart from one another.

As is apparent from FIG. 4, the base body 3 of the spring element 1 is embodied as a hollow body and has a cutout 23 which is oriented coaxially with respect to the longitudinal axis L. The cutout 23 is widened on the side of the first end side 10 by means of a conical face 27. The cutout 23 is equally widened on the second end side by means of a conical face 25.

The cutouts 9 are, when considered from the lateral face of the base body 3, let more deeply into the base body 3 than the groove 5. A distance x is formed between the groove base 17 and the cutout 9. The distance x is preferably in a region of 1 mm or more, more preferably in a range from 1 to 6 mm, particularly preferably in a range from 2 to 3 mm.

The cutout 9 is preferably embodied in the shape of a partial sphere. The corresponding sphere diameter is preferably in a range from 2 mm to 30 mm, and is particularly preferably 8 mm or more.

FIG. 5 illustrates that the supporting ring 9 is not embodied monolithically but rather has a core 8 which is encased by an elastomer 14. The core 8 is preferably embodied in a metallic fashion.

While the spring element 1 was respectively illustrated in an isolated form in FIGS. 1 to 4, in FIG. 5 an installation situation of the spring element 1 is depicted. The spring element 1 is installed in a test arrangement 50. The test arrangement 50 has a retaining die 51, into which the spring element 1 is clamped with its mounting flange 15.

The test arrangement 50 also has a compression die 53 which is configured to be placed in abutment with the projections 13 of the spring element 1.

The retaining die 51, the compression die 53 and the spring element 1 are held essentially coaxially with respect to the longitudinal axis L by a centering mandrel 55.

The test arrangement 50 corresponds structurally to a vehicle shock absorber according to the invention. In such a vehicle shock absorber 50 according to the invention the retaining die 51 would be a supporting part, while the compression die 53 would be a damper cap of the vehicle shock absorber. The centering mandrel 55 would be, when transferred to the vehicle shock absorber according to the invention, a piston rod.

In the case of the test arrangement 50, in order to determine a force/deflection characteristic curve or a rigidity profile the spring element is compressed in the direction of the longitudinal axis L. This is done by moving the compression die 53 in the direction of the arrow 54 and/or by moving the retaining die 51 in the direction of the arrow 56. Owing to the relative movement of the dies 51, 53, the spring element 1 is deformed elastically from the uncompressed basic state shown in FIG. 5 into a compressed state. In this context, initially only a small amount of force is necessary, which results in a flat profile of the force/deflection characteristic curve (see region $K_1$ in FIG. 6).

Starting from a certain amount of deformation, characterized in FIG. 6 by point P, the deformation of the spring element 1 is continued to such an extent that the material of the base body 3 has moved into the cutouts 9, essentially (FIGS. 1 to 4) in the direction of the arrows 57 in the direction of the supporting ring 7. This evasive movement in the direction of the arrows 57 can be seen in FIG. 7: the region $K_1$ has a local maximum M on a rigidity curve $S_1$ for a spring element from the prior art which does not have any cutouts in the groove. After the maximum M has been passed through, the rigidity decreases for a short deflection range, before then rising strongly in sector $K_2$ starting approximately from point P.

However, as a result of the fact that the spring elements which are embodied according to the invention have cutouts 9 (FIGS. 1 to 5), when compression commences in the region $K_1$ the material can firstly move out into the cutouts 9, which results in a significantly flatter profile of the rigidity curves $S_2$, $S_3$. The curves $S_2$, $S_3$ differ only slightly, which is attributable to the differing number of cutouts 9. The curve $S_2$ represents a spring element with, for example, eight cutouts, while the curve $S_3$ represents a spring element with, for example, 10 cutouts. Both graphs run approximately in a strictly monotonously rising fashion, but rising at any rate in a significantly more uniform fashion than the curve $S_1$ according to the prior art.

In a way which is analogous to the installation in a test arrangement 50, the same force/deflection profile as in FIG. 6 and also the same rigidity profile as in FIG. 7 would be obtained for the spring elements 1 according to the invention if they were installed in a vehicle shock absorber.

The invention claimed is:

1. A spring element for a vehicle shock absorber, comprising:
    a longitudinal axis and a base body which extends along the longitudinal axis and can be elastically deformed between an uncompressed basic state and a state in which it is compressed in a direction of the longitudinal axis;
    a groove which runs around an outside of the base body; and
    a supporting ring arranged in the groove,
        wherein in a basic state of the base body one or more cutouts are formed between the supporting ring and the base body in the groove,
        wherein a gap which permits air to escape is formed between the supporting ring and the one or more cutouts.

2. The spring element according to claim 1, wherein the plurality of cutouts are embodied in a form of:
    cylindrical, partially cylindrical or hollow-cylindrical recesses,
    conically tapering recesses,
    partially conically shaped recesses,
    polygonal or partially polyhedron-shaped recesses, or
    a combination of a plurality of the recess shapes.

3. The spring element according to claim 1, wherein the plurality of cutouts are provided and are arranged distributed uniformly over the circumference of the groove.

4. The spring element according to claim 1, wherein the base body is partially or completely composed of an elastomer.

5. The spring element according to claim 1, wherein the supporting ring is partially composed of an elastomer, and has a metal core, which is encased by the elastomer.

6. A vehicle shock absorber comprising:
the spring element according to claim 1.

* * * * *